Figure 1:
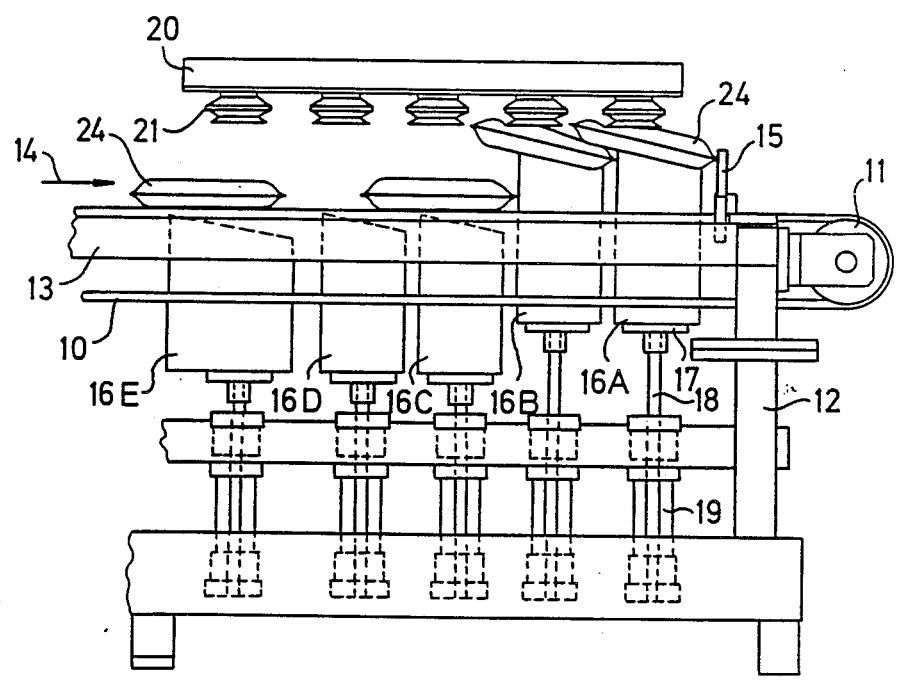

United States Patent [19]

Johansson

[11] Patent Number: 4,765,452
[45] Date of Patent: Aug. 23, 1988

[54] DEVICE IN A MACHINE HANDLING PACKAGE UNITS

[75] Inventor: Per Johansson, Harlösa, Sweden

[73] Assignee: Packsystem i Lund AB, Lund, Sweden

[21] Appl. No.: 12,122

[22] PCT Filed: Apr. 21, 1986

[86] PCT No.: PCT/SE86/00180
§ 371 Date: Dec. 22, 1986
§ 102(e) Date: Dec. 22, 1986

[87] PCT Pub. No.: WO86/06356
PCT Pub. Date: Nov. 6, 1986

[30] Foreign Application Priority Data
Apr. 22, 1985 [SE] Sweden ............... 8501935

[51] Int. Cl.⁴ ............... B65G 47/26
[52] U.S. Cl. ............... 198/431; 198/463.6; 198/468.8; 414/29
[58] Field of Search ............... 198/425, 431, 345, 428, 198/463.6, 429, 341, 468.2, 468.4, 468.8, 460; 414/28, 29; 53/499, 539, 542

[56] References Cited

U.S. PATENT DOCUMENTS
4,120,393 10/1978 Motooka et al. ............... 198/463.6
4,199,050 4/1980 Moller ............... 198/429

FOREIGN PATENT DOCUMENTS
2106795 8/1971 Fed. Rep. of Germany .
627996 2/1982 Switzerland .
638747 10/1983 Switzerland .
478385 1/1938 United Kingdom .
1097115 12/1967 United Kingdom .

Primary Examiner—Joseph E. Valenza
Attorney, Agent, or Firm—Merchant, Gould, Smith, Edell, Welter & Schmidt

[57] ABSTRACT

A device on a machine handling package units (24) comprises a conveyer with endless elements (10) running in parallel for the conveyance of the units, a number of abutments (16A–16E) for the conveyed units, spaced in the longitudinal direction of the conveyor, said plates being arranged in parallel and with the flat sides thereof in the longitudinal direction of the conveyer, and a gripper (20) for lifting of the units detained against the plates.

3 Claims, 2 Drawing Sheets

DEVICE IN A MACHINE HANDLING PACKAGE UNITS

This application is the U.S. national application of international application PCT/SE 86/00180 filed Apr. 21, 1986.

This invention relates to a device in a machine handling package units, comprising a conveyer with several endless elements running in parallel for the conveyance of the units, a number of abutments for the conveyed units, spaced in the longitudinal direction of the conveyor, which can be raised individually between the endless elements, and a gripper for lifting off the units detained against the abutments.

In a prior art embodiment of such a device the abutments comprise pins arranged in groups, the pins in each group being aligned in the transverse direction of the conveyer and being displaceable vertically between a lower inoperative position, in which the pins are below the load-carrying surface of the endless elements, and an upper operative position, in which the pins project above the load-carrying surface of the endless elements to detain the units being advanced on the conveyer. The endless elements then will slip against the underside of the detained units. The groups of pins are mutually spaced in the longitudinal direction of the conveyer and are successively adjusted from the inoperative to the operative position thereof, starting from the group most remote downstream, the pins in each group being displaced jointly. When a unit abuts a group of pins and is detained by the pins thereof, the next group of pins, as seen in the upstream direction, is displaced to the operative position to detain the next unit approaching on the conveyor, and this proceeds until a predetermined number of units are detained in a stationary position on the conveyor, which is moving continuously and, as mentioned above, slips against the underside of the units. The gripper, which in the prior art embodiment comprises an assembly with a number of suction cups, then is moved towards the units to suck up said units and then causes the units to be lifted from the conveyer and to be deposited in a packagebox, in a tray, or on a pallet. In this way layer by layer of package units are removed from the conveyer to be deposited in the packagebox.

The prior art device described above performs well but the working speed thereof is limited because the suction cups have to come to a halt a short distance above the package units until all those units to be included in a layer are positioned on the conveyer. Not until then the suction cups can be engaged with the units and lift these off, and not until the lifting off has taken place the next unit can advance to the pins most remote downstream.

It is an object of this invention to provide a device of the kind referred to above permitting an increased speed in handling the package units and moreover enabling package units in form of bags to be packed in a more space saving way, i.e. with the bags of one and the same layer partly overlapping each other.

To achieve the object referred to above the device according to the invention has obtained the characteristics described below and shown in the drawings.

Figure 2:
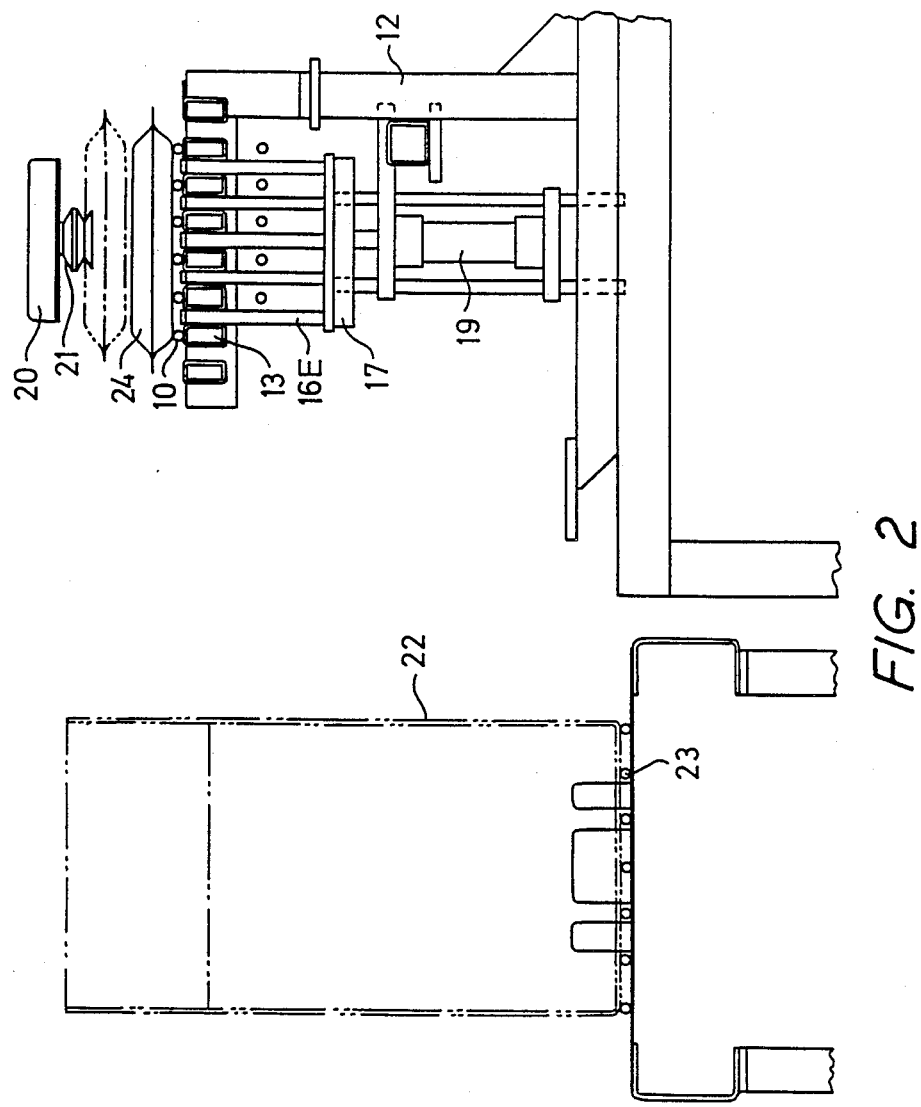

In order to explain the invention an embodiment thereof will be described in more detail below with reference to the accompanying drawings, wherein FIG. 1. is a side view of the device according to the invention and FIG. 2 is an end view of the device.

In the drawings the device according to the invention is shown applied to a machine for handling bags, and in this embodiment it has been found to be in principal particulary well adapted for handling also bags with such fragile content as potatochips.

The device comprises a conveyer with a number of endless elements 10 running in parallel, which are spaced in the transverse direction of the conveyer and may comprise belts or cords. The endless elements run around turning wheels 11, rotatably mounted on a frame 12, and are supported in the upper load-carrying part thereof on beams or rails 13 having a box-like cross section, which extend in the longitudinal direction of the conveyer. The feeding direction of the conveyer is indicated by an arrow 14. At the downstream end of the conveyer stationary abutments 15 are arranged comprising a number of pins arranged in a row in the transverse direction of the conveyer, said pins being positioned in the spaces between the endless elements 10. In these spaces also a number of plates 16A–16E are positioned, spaced in the longitudinal direction of the conveyer between the groups and positioned with the flat sides in the longitudinal direction of the conveyer in parallel with each other. Each group of plates is connected to a cross-bar 17, connected to the piston rod 18 of a pneumatic cylinder 19, supported on the frame 12, for vertical displacement of the plates. In the upper end thereof the plates have an inclined edge, inclining from the top downwards in the feeding direction of the conveyer. By elements of the cylinder 19 the groups of plates can be displaced between a lower position, shown with reference to the plates 16C–16E, which is an inoperative position in which the plates are positioned with their upper edge below the load-carrying surface of the endless elements 10, and an upper position, shown with reference to the plates 16A and 16B, which is an operative position in which the upper inclined edge surface of the plates is raised above the load-carrying surface of the endless elements 10.

The device also comprises a gripper which in the present case includes a suction head 20 with five suctioncups 21 each of which is positioned generally opposite to one of the five groups of plates. The suction head is load-carrying in a way not shown in more detail herein, for instance by a pivoted lever to be moved between the position of FIG. 1 and FIG. 2 above the conveyer 10 to a position more or less deep down in an unfolded container 22 standing on a conveyer 23 running in parallel with the conveyer 10. It is connected to suction means, for instance to a high pressure fan, and the suction effect is controlled by opening and closing, respectively, an air inlet in the suction pipe to the suction head.

In the embodiment described the device operates as follows. All plates 16A–16E initially are in the lower inoperative position so that a package unit 24 approaching on the conveyer 10 and positioned transversely thereof will abut the pins 15 and will be detained by said pins, while the endless elements 10 slip against the underside of package unit. However, this occurs only temporarily, because immediately after the arrival at the pins 15 the package is lifted by moving the plates 16A to the upper operative position. Then, the package unit 24 is laying on the upper inclined edge of the plates in an inclined position with the rear edge of the unit higher than the front edge thereof, and with the unit contacting the associated suction cup 21. The next package unit on the conveyer will now not reach the pins 15 but will be stopped by the plates 16A, and immediately after that the plates 16B are lifted to the operative position to place the second package unit in the same position as the first one, as shown in the drawing, FIG. 1. The raised position is also shown with dash-and-dot lines in FIG. 2. The next package unit, which may be referred to as the third unit, in FIG. 1 is shown just as it abuts the raised plates 16B, while the plates 16C are in the lower inoperative position, but in the next step of the cycle of the device these plates will be raised to a position corresponding to that of the first two package units, and subsequent package units will be subject to the same treatement.

As the fifth package unit is raised towards the associated suction cup 21, the remaining suction cups are already in contact with the remaining package units, so that the fifth unit momentarily will be sucked against the associated suction cup and all the package units can now be lifted off the plates to be deposited in the container 22. At the same time all the plates 16A-16E are returned to the lower position allowing new package units 24 to be moved immediately to a position below the raised units in the direction of the pins 15 for repetition of the desribed cycle. By this treatment each layer in the container will contain five package units, the units in each layer partly overlapping each other, which is very suitable as far as package units in the form of bags are concerned, since a considerable saving of space is obtained and thus a predetermined number of bags can be placed in a smaller container than if the bags were placed in a flat layer edge by edge.

The fast "suction" of the package units, which is achieved as a result of units already arrived being lifted into contact with the suction cups of the suction head while subsequent units are arriving, implies that the device operates at a very high speed.

The cycle can be controlled by means of photocells which detect the units as they reach the position above the associated plates and below the associated suction cups, respectively, and which when detecting the presence of a unit activate the associated pneumatic cylinder to raise the plates while at the same time the photocell for the adjacent upstream plates are activated for detection. Then, the photocells and the pneumatic cylinders preferably are controlled by a micro-processor.

The number of plates in each group as well as the angle of inclination of the upper edge of the plates in each specific case will be determined by the type of package units to be handled and must be determined empirically. In case of comparatively stiff package units in shape of a parallelepiped overlapping may not be suitable and that case the upper edge of the plates is made horisontal.

It is advantageous to have a gripper comprising a suction head but other types of grippers, such as completely mechanical grippers, may of course be used in the device according to the invention, if it is more convenient.

I claim:

1. A device for handling package units transported by a conveyor having a plurality of endless elements (10) running in parallel with one another and including means for conveyance of package units therealong; said device comprising:
    (a) a plurality of abutments (16A-16E) for conveyed units; said abutments being spaced in a longitudinal direction of the conveyor; and, each abutment being selectively orientable to engage units on the conveyor;
        (i) each abutment having an upper inclined surface, each inclined surface inclining downwardly substantially along a feeding direction of the conveyor;
        (ii) each abutment member being selectively, individually, movable between an inoperative position disposed below a load-carrying surface of the conveyor and an operative position with said upper inclined surface raised substantially above the load-carrying surface of the conveyor;
        (iii) adjacent abutment members being spaced, longitudinally, so that a package unit selectively supported on one abutment member upper inclined surface overlaps, at least partially, a package unit supported on a next upstream abutment member;
    (b) means selectively actuating said abutment members between said inoperative and operative positions; and,
    (c) a gripper (20) including means constructed and arranged to selectively: collect a plurality of overlapped package units supported by said abutments in operation; support the overlapped package units; and, deposit the plurality of overlapped units in an overlapping manner;
    (d) whereby, in operation, package units moved along the conveyor can be selectively engaged by said abutments and raised above the load-carrying surface in an overlapping relationship to one another; and,
    (e) whereby the package units can be selectively deposited in an overlapping arrangement.

2. A device according to claim 1 wherein:
    (a) each abutment comprises a plurality of plates one each of which is positioned between a pair of endless elements (10); said plates of each abutment being aligned substantially parallel to one another and orientable with opposite, substantially flat, sides thereof aligned in a longitudinal direction of the conveyor.

3. A device according to claim 2 wherein:
    (a) each abutment member upper inclined surface comprises upper edge portions of the plates of said abutment member.

* * * * *